(12) United States Patent
Adkins

(10) Patent No.: US 7,775,306 B1
(45) Date of Patent: Aug. 17, 2010

(54) MOTORIZED WHEELBARROW AND ASSOCIATED METHOD

(76) Inventor: Terry Adkins, 1939 Suncrest Blvd., El Cajon, CA (US) 92021

( * ) Notice: Subject to any disclaimer, the term of this patent is extended or adjusted under 35 U.S.C. 154(b) by 1 day.

(21) Appl. No.: 12/082,230

(22) Filed: Apr. 9, 2008

(51) Int. Cl.
*B62D 51/04* (2006.01)

(52) U.S. Cl. ................................ 180/19.3; 180/65.3

(58) Field of Classification Search ............ 180/19.1, 180/65.3, 19.3; 280/47.31
See application file for complete search history.

(56) References Cited

U.S. PATENT DOCUMENTS

| | | | | |
|---|---|---|---|---|
| 5,284,218 A * | 2/1994 | Rusher, Jr. | ................ | 180/19.1 |
| 5,305,843 A * | 4/1994 | Armstrong | ................ | 180/19.1 |
| 5,465,801 A * | 11/1995 | Hoover | ................ | 180/19.1 |
| 6,065,555 A * | 5/2000 | Yuki et al. | ................ | 180/19.1 |
| 6,409,273 B1 * | 6/2002 | Campbell | ................ | 298/2 |
| 6,422,329 B1 * | 7/2002 | Kazerooni et al. | ........ | 180/19.3 |
| 6,470,981 B1 * | 10/2002 | Sueshige et al. | ........... | 180/19.3 |
| 6,598,693 B2 * | 7/2003 | Honda et al. | ................ | 180/205 |
| 2003/0205417 A1 * | 11/2003 | Simons et al. | ............ | 180/19.1 |
| 2007/0079998 A1 * | 4/2007 | Walter | ................ | 180/19.1 |
| 2007/0079999 A1 * | 4/2007 | Lamanna | ................ | 180/19.1 |

* cited by examiner

*Primary Examiner*—Tony H. Winner

(57) ABSTRACT

A motorized wheel barrow includes a storage pan, a handle assembly, an electrical control assembly, and a wheel assembly with an axle transversely spanning across a width of the storage pan and coupled to the handle assembly while remaining spaced from the storage pan. The device further includes a mechanism for automatically generating a torque at the wheel assembly to thereby selectively propel the motorized wheel barrow along first and second opposed directions based upon first and second user inputs respectively.

4 Claims, 14 Drawing Sheets

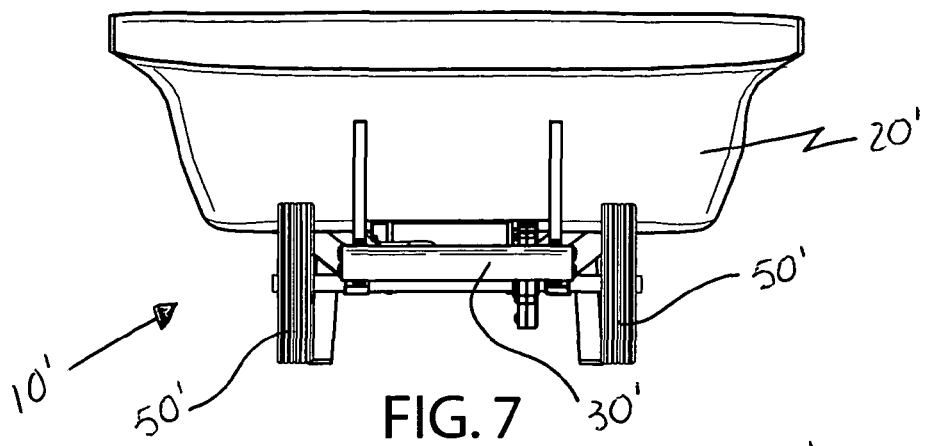
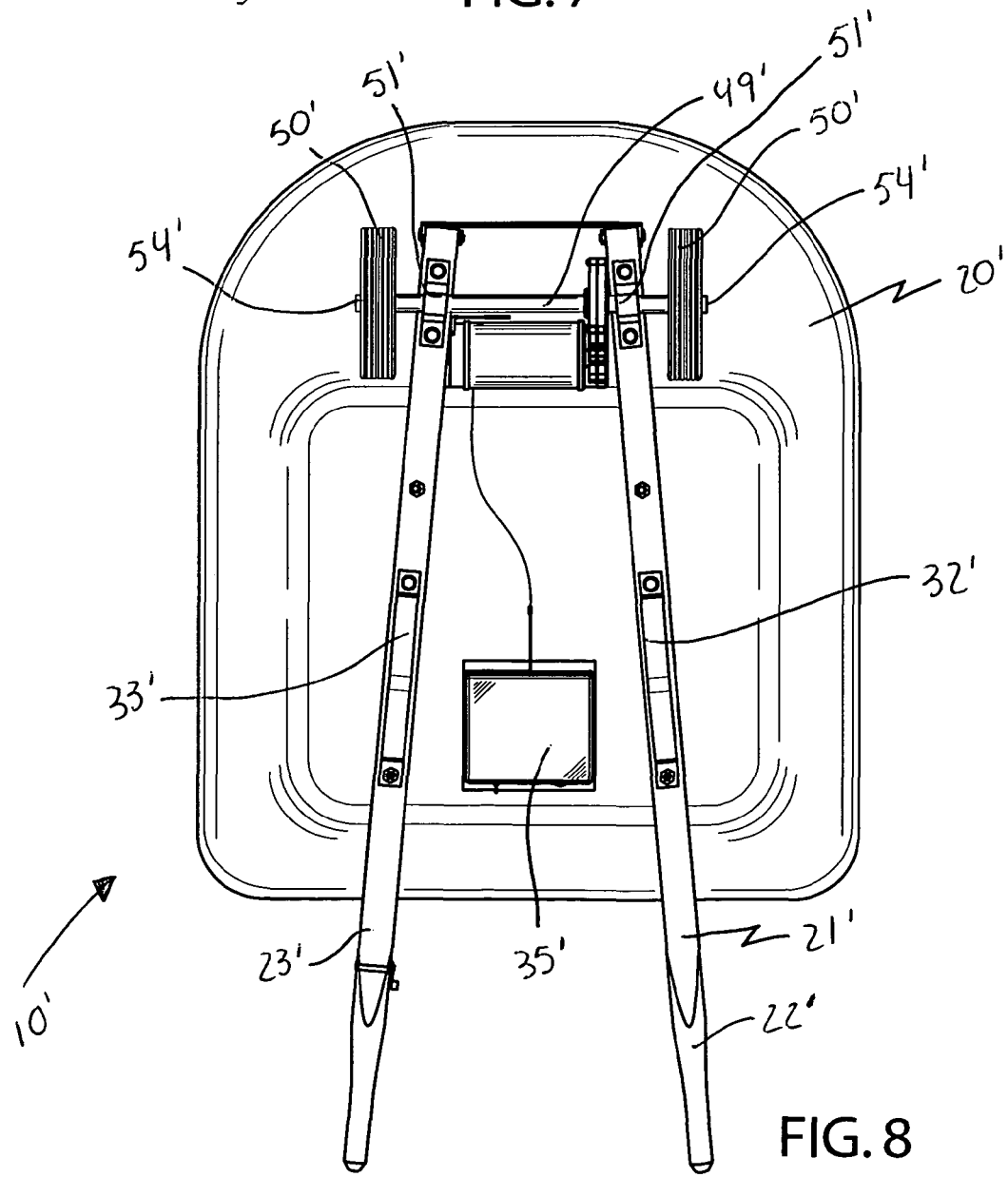

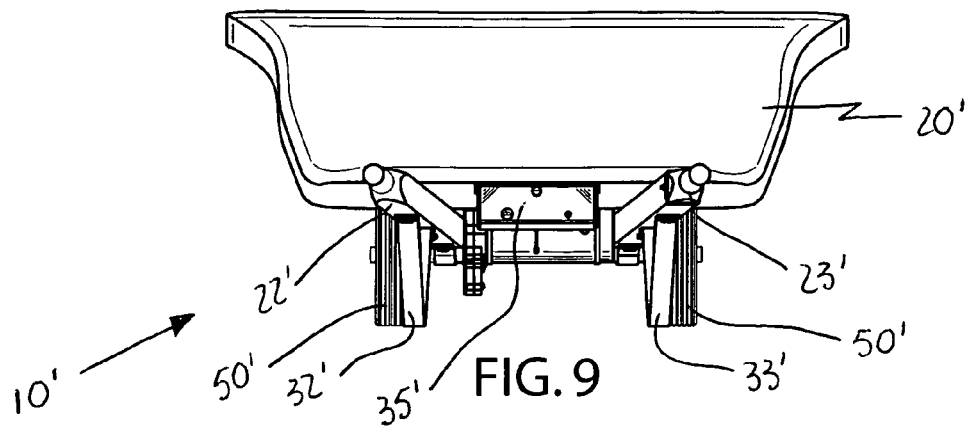
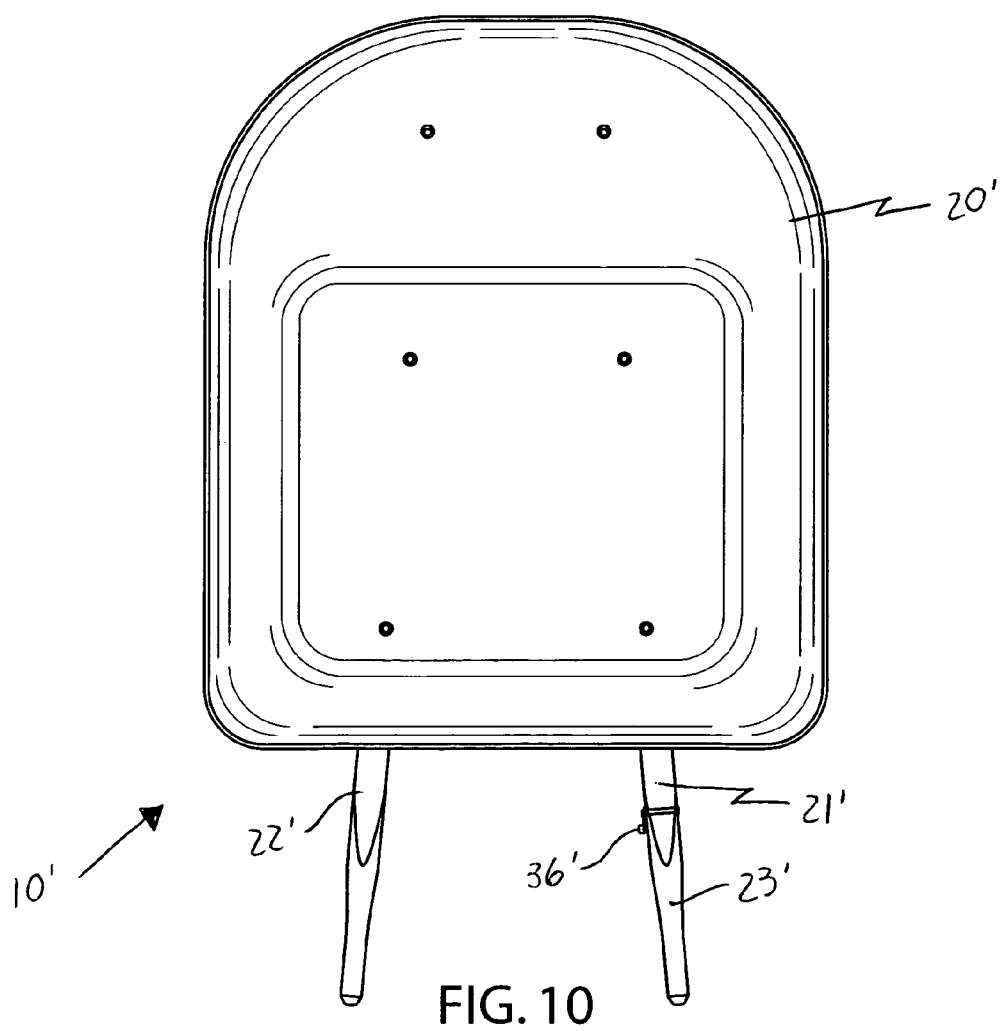

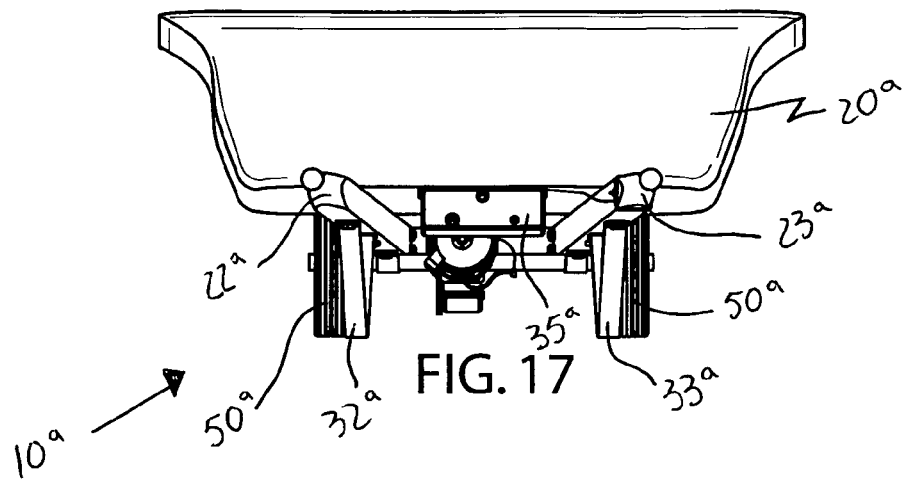
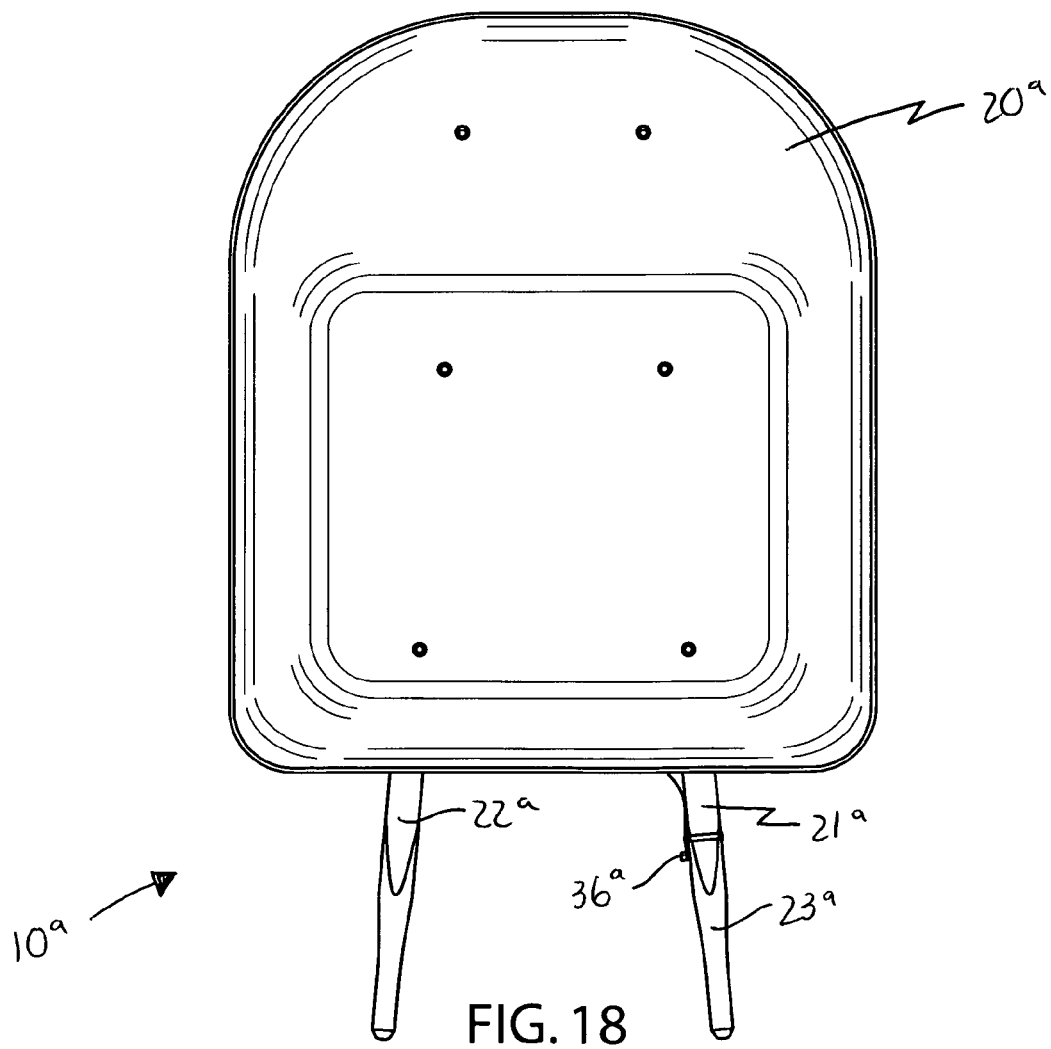

MOTORIZED WHEELBARROW AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to wheel barrows and, more particularly, to a motorized wheel barrow for transporting objects between remote locations.

2. Prior Art

Whether you're building something, erecting a brick wall, or just doing general garden cleanup, you need something in which to carry the stuff. For centuries, it's been the wheelbarrow, a one-wheeled, hand-guided cart. Wheelbarrows always look as though they have been around forever. In fact, they have. Records suggest that the first wheeled vehicles, two and four-wheeled carts pulled by oxen, were made in about 3,500 BC by the Sumerians, who lived in Mesopotamia. Wheeled technology spread rapidly through much of Europe and Central Asia, reaching China in the middle of the third millennium BC. In return, the Chinese gave us the wheelbarrow.

Legend has it that the first wheelbarrow was the brainchild of a Chinese inventor, Ko Yu. However, most sources credit Chuko (Zhuge) Liang (181-234 AD) as the wheelbarrow's true inventor. The wheelbarrow is one of the best labor saving inventions ever developed. A wheelbarrow is a small one or two-wheeled cart designed to be pushed by a single person using two handles at the rear. They are designed to ease the transport of heavy, often loose, loads and are common in the construction industry and in gardening.

The basic concept has remained the same for centuries. It's a simple device that handles outdoor jobs such as moving bricks, dirt, cement, compost, trash, leaves, and other materials. Although wheelbarrows are simple devices, a visit to any hardware store or home and garden center shows that they are available in a wide variety of sizes and shapes. One of the biggest disadvantages of the conventional wheelbarrow is the fact that a user must entirely operate the apparatus under their own power. Thus, persons like the elderly and those who are physically compromised may not be able to do tasks that require the use of a wheelbarrow. Obviously, it would be advantageous to provide a wheelbarrow that makes it possible to easily transport large loads.

U.S. Pat. No. 5,465,801 to Hoover discloses a motorized wheelbarrow for transporting materials placed therein from one location to another comprising a rigid container having a front portion, a rear portion, a lower portion, an opened upper portion, and a hollow space disposed between the portions adapted for holding materials to be transported. An elongated axle is coupled to the lower portion of the container adjacent to the front portion thereof, and a pair of wheels are included, each wheel rotatably coupled to an end of the axle. The wheelbarrow further includes a pair of legs extending downwards from the lower portion of the container adjacent to the rear portion thereof for holding the container in a generally level and stationary position, a pair of handles coupled to the container and extended from the rear portion thereof for raising the rear portion, a motor coupled to the container, a drive mechanism coupled between the motor and axle for transferring rotational motion from the motor to the axle and wheels for transporting the container, a battery coupled to the container for energizing the motor, and a control switch connected between the motor and the battery and coupled to one of the handles. The control switch is operable in one orientation to energize the motor and another orientation to de-energize the motor. Unfortunately, this prior art example is not designed specifically for hauling larger loads.

U.S. Pat. No. 5,489,000 to Hillbohm discloses a motorized wheelbarrow that comprises a pan for receiving a load to be transported by the barrow, at least a wheel arranged to bear on the ground and a motor arranged to rotate the wheel for moving the wheelbarrow over the ground. The motor is located under the pan and with its center of gravity in front of a vertical plane including the axle of rotation of the wheel as seen in the direction of movement in the transport position of the wheelbarrow. Unfortunately, this prior art example is not designed specifically for hauling larger loads.

U.S. Pat. No. 6,745,859 to Simons discloses a powered wheel assembly for use in connection with a wheelbarrow that includes in one embodiment a frame that includes support members, a wheel assembly that includes a wheel, an axle, an axle housing, a pin for connecting the axle and axle housing, and a drive assembly that includes a primary gear drive and a final chain drive. Upon retrofit to an existing wheelbarrow, the powered wheel assembly permits an operator to selectively operate the wheelbarrow in a powered and non-powered mode of transport. Unfortunately, this prior art example is not designed specifically for hauling larger loads.

Accordingly, the present invention is disclosed in order to overcome the above noted shortcomings. The motorized wheel barrow is convenient and easy to use, lightweight yet durable in design, and designed for transporting objects between remote locations. The device is simple to use, inexpensive, and designed for many years of repeated use.

BRIEF SUMMARY OF THE INVENTION

In view of the foregoing background, it is therefore an object of the present invention to provide an apparatus for transporting objects between remote locations. These and other objects, features, and advantages of the invention are provided by a motorized wheel barrow.

A motorized wheel barrow includes a storage pan and a handle assembly connected to such a storage pan. Such a handle assembly includes first and second rectilinear primary shafts converging inwardly towards a distal end of the storage pan, and first and second support arms with opposed ends are directly coupled to an underside of the storage pan and distal ends of the first and second primary shafts respectively. The hand assembly further includes a cross-brace with opposed ends directly anchored to the distal ends of the first and second primary shafts respectively, and first and second stabilizing V-shaped levers directly mated to respective undersides of the first and second primary shafts respectively for effectively balancing the storage pan and a substantially stable position during non-transport conditions.

The device further includes an electrical control assembly coupled to the storage pan. Such an electrical control assembly includes a casing mounted to an underside of the storage pan, a rheostat speed controller mounted to a proximal end of the handle assembly and disposed exterior of the casing, and a wiring harness electrically coupled to rheostat speed controller and disposed within the casing. The electrical control assembly further includes an operating switch electrically coupled to the rheostat speed controller and the wiring harness, a fuse electrically coupled to the rheostat speed controller and the operating switch and disposed within the casing, a control plug electrically coupled to the wiring harness and disposed within the casing, and a control box electrically coupled directly to the control plug and disposed within the casing. The electrical control assembly further includes a plurality of internal batteries electrically coupled to the control box and conveniently disposed within the casing, a battery charger electrically coupled to the internal batteries and disposed within the casing, a battery meter electrically coupled to the fuse for indicating a quantity of power remaining in the internal batteries, and a power plug electrically coupled to the battery charger and selectively mated to an external power supply source.

The device further includes a wheel assembly with an axle transversely spanning across a width of the storage pan and coupled to the handle assembly while remaining spaced from the storage pan. Such a wheel assembly includes a first wheel concentrically mounted to the axle and centrally registered between lateral ends of the handle assembly, and a plurality of brackets directly connected to the axle and the handle assembly such that the axle advantageously remains fixedly coupled to a bottom most surface of the handle assembly. The wheel assembly further includes first and second wheels concentrically mounted to axially opposed ends of the axle and positioned outside lateral ends of the handle assembly, and a plurality of brackets directly connected to the axle and the handle assembly such that the axle remains fixedly coupled to a bottom most surface of the handle assembly.

The device further includes a mechanism for automatically generating a torque at the wheel assembly to thereby selectively propel the motorized wheel barrow along first and second opposed directions based upon first and second user inputs respectively. Such an automatic torque generating mechanism is electrically coupled to the electrical control assembly and effectively includes an electric motor mounted to the storage pan, a neutral gear lever coupled to the electric motor for allowing a user to adapt the electric motor to a neutral position, and a multi-directional gear assembly including a multi-directional gear box coupled to the electric motor and the wheel assembly respectively. Such a multi-directional gear assembly includes a reversible multi-gear box directly coupled to the electric motor and the axle respectively, and a reversible multi-gear box directly coupled to the electric motor and the pan respectively. The multi-directional gear assembly further includes a drive sprocket directly coupled to the reversible multi-gear box and spaced from the axle, a driven sprocket directly and statically mounted about the axle, and a drive chain engaged about the drive and driven sprockets and thereby causing the axle to rotate as the driven sprocket rotates.

A method for transporting objects between remote locations includes the steps of: providing a storage pan; providing and connecting a handle assembly to the storage pan; providing and coupling an electrical control assembly to the storage pan; providing a wheel assembly with an axle transversely spanning across a width of the storage pan; coupling the wheel assembly to the handle assembly while maintaining the wheel assembly spaced from the storage pan; and automatically generating a torque at the wheel assembly and thereby selectively propelling the motorized wheel barrow along first and second opposed directions based upon first and second user inputs respectively.

The method further includes the steps of: providing and mounting an electric motor to the storage pan; providing and coupling a neutral gear lever to the electric motor for allowing a user to adapt the electric motor to a neutral position; and providing and coupling a multi-directional gear assembly including a multi-directional gear box to the electric motor and the wheel assembly respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 7 is a front elevational view of the alternate embodiment of the motorized wheelbarrow, in accordance with the present invention;

FIG. 8 is a bottom planar view of the alternate embodiment of the motorized wheelbarrow, in accordance with the present invention;

FIG. 9 is a rear elevational view of the alternate embodiment of the motorized wheelbarrow, in accordance with the present invention;

FIG. 10 is a top planar view of the alternate embodiment of the motorized wheelbarrow, in accordance with the present invention;

FIG. 17 is a rear elevational view of the third embodiment of the motorized wheelbarrow, in accordance with the present invention;

FIG. 18 is a top planar view of the third embodiment of the motorized wheelbarrow, in accordance with the present invention;

DETAILED DESCRIPTION OF THE INVENTION

Figure 1:
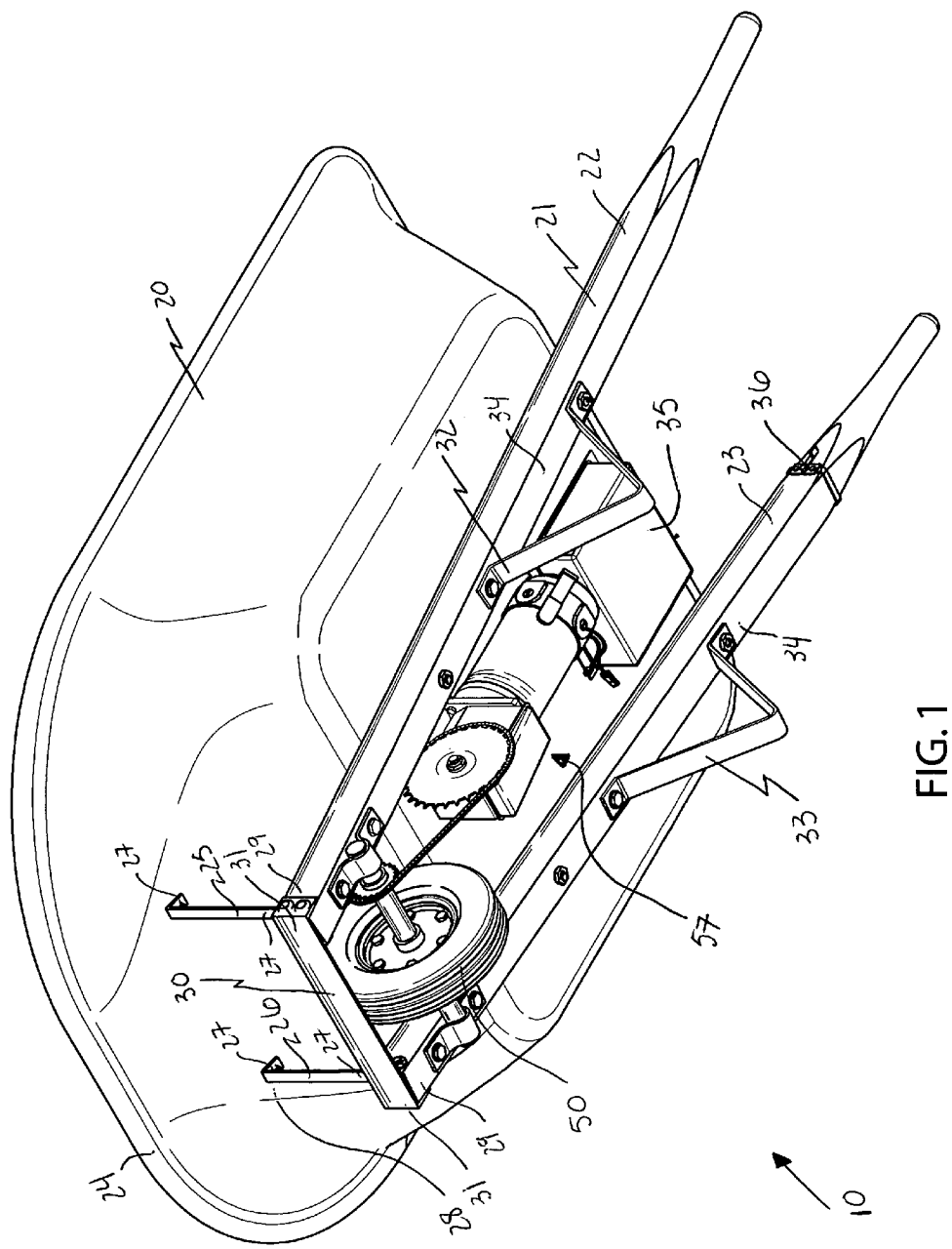
FIG. 1 is a perspective and bottom planar view of a motorized wheelbarrow, in accordance with the present invention.
Figure 2:
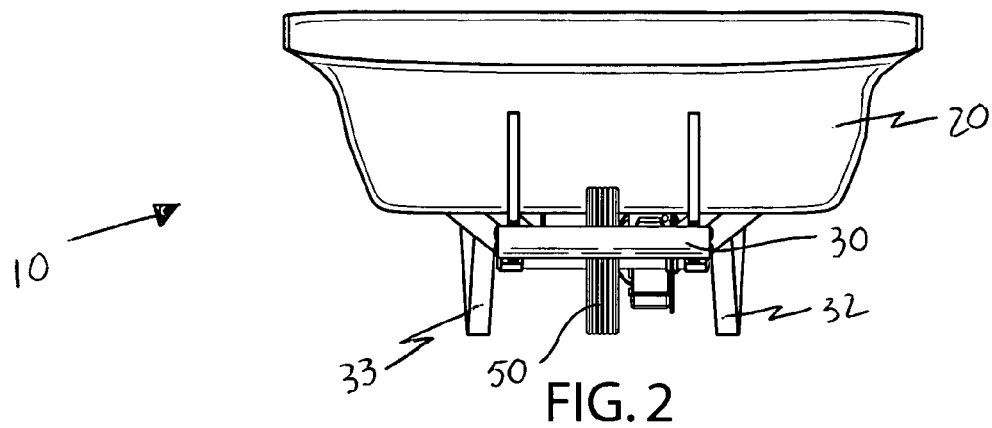
FIG. 2 is a front elevational view of the motorized wheelbarrow, in accordance with the present invention.
Figure 3:
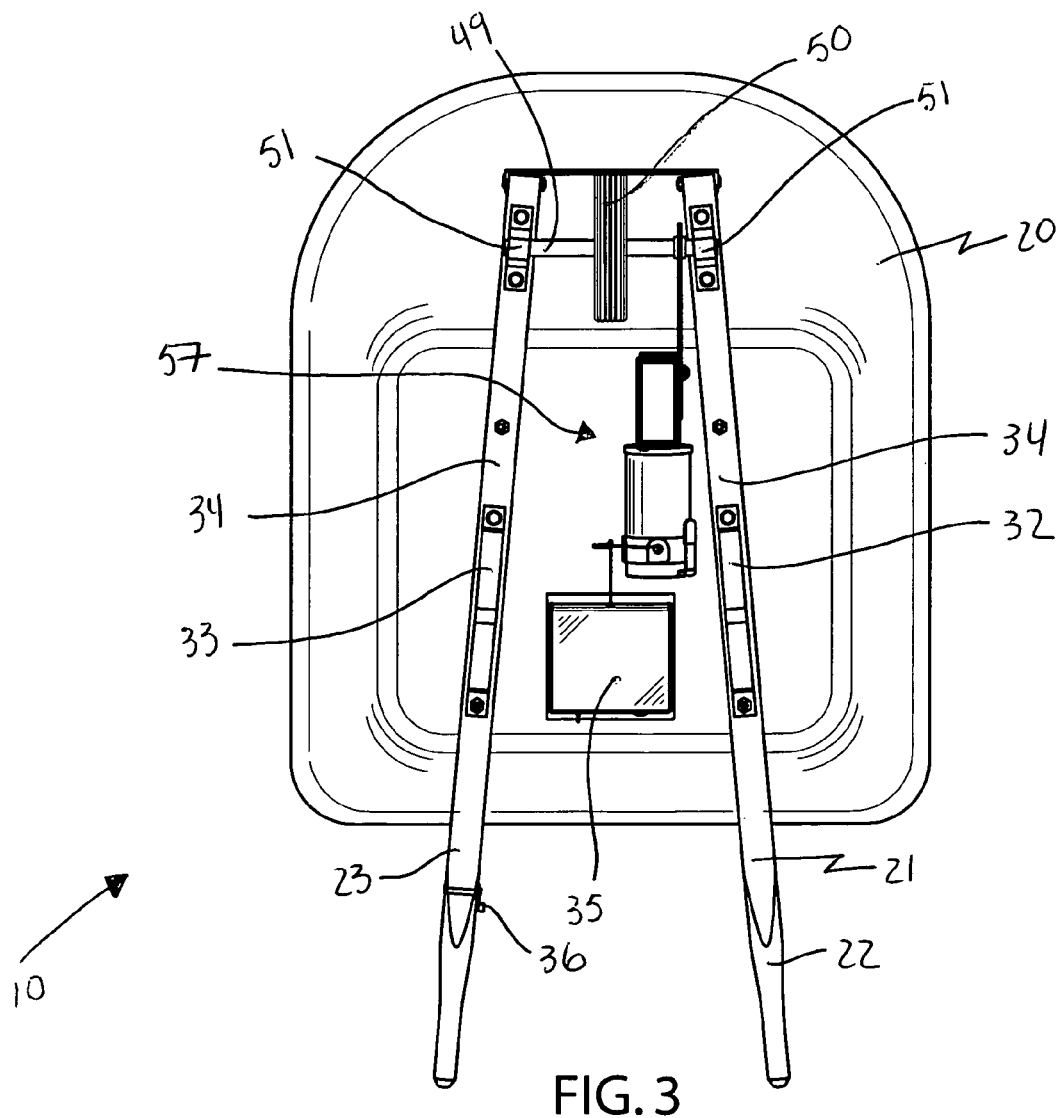
FIG. 3 is a bottom planar view of the motorized wheelbarrow, in accordance with the present invention.
Figure 4:
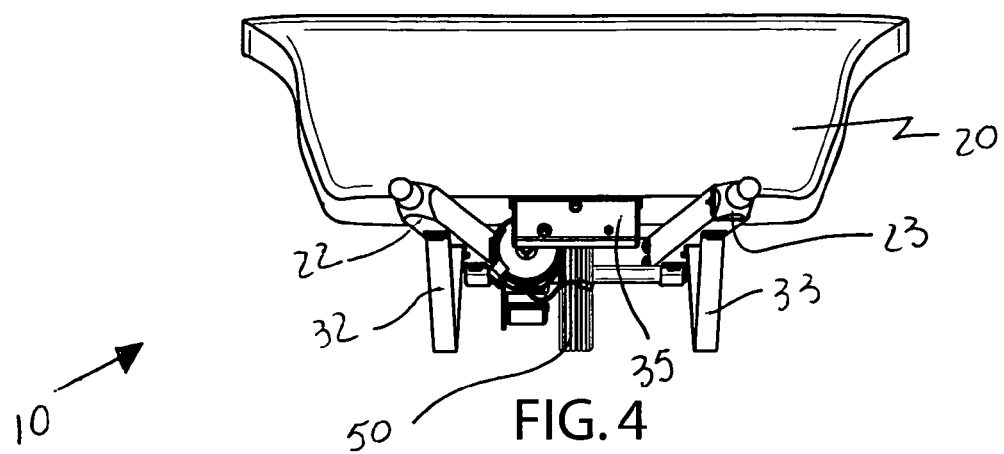
FIG. 4 is a rear elevational view of the motorized wheelbarrow, in accordance with the present invention.
Figure 5:
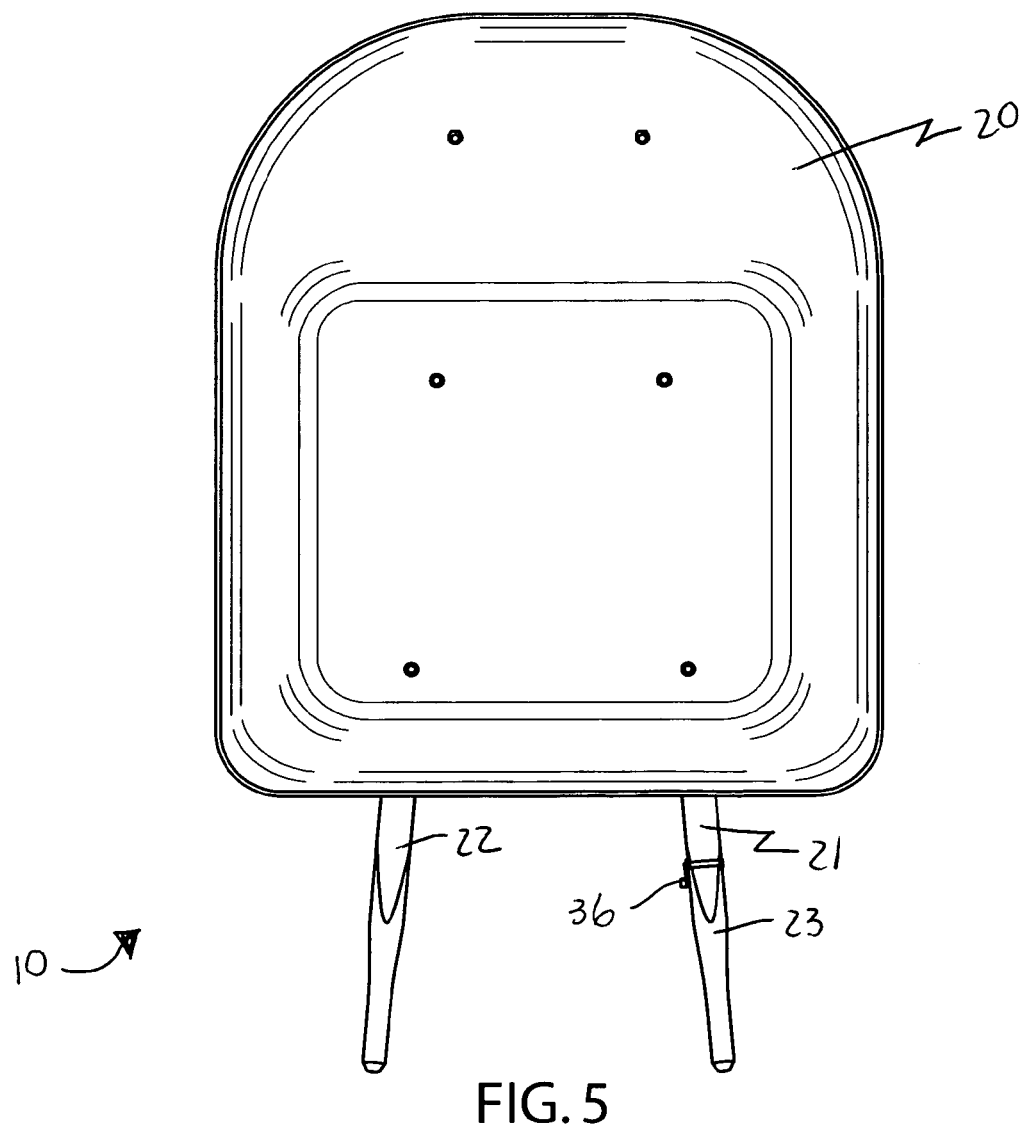
FIG. 5 is a top planar view of the motorized wheelbarrow, in accordance with the present invention.
Figure 6:
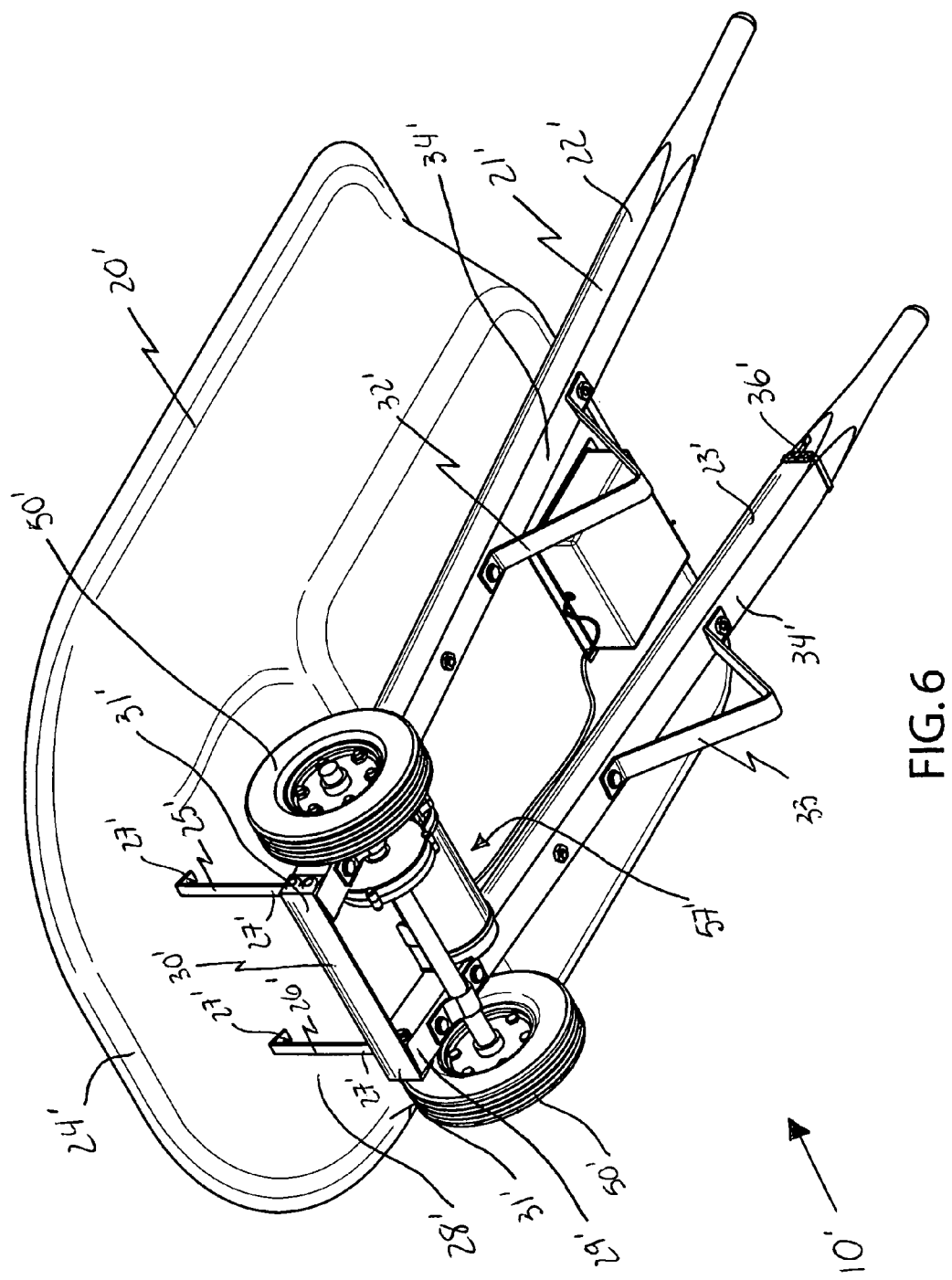
FIG. 6 is a perspective and bottom planar view of an alternate embodiment of a motorized wheelbarrow, in accordance with the present invention.
Figure 11:
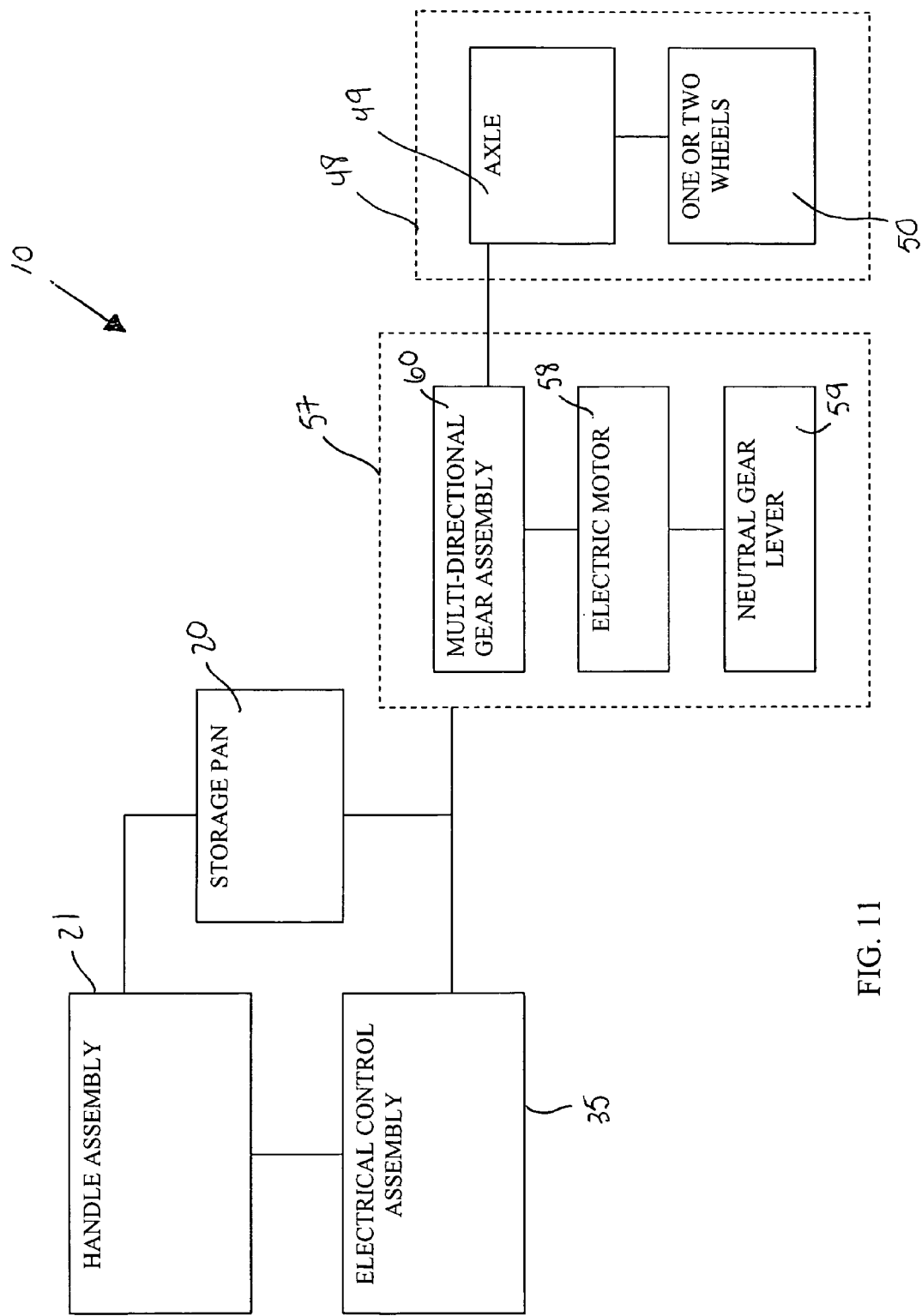
FIG. 11 is a schematic block diagram of the motorized wheelbarrow, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-20 by the reference numeral 10 and is intended to protect a motorized wheelbarrow. It should be understood that the apparatus 10 may be used to protect many different types of wheelbarrows and should not be limited to use with only those types of wheelbarrows mentioned herein.

Referring initially to FIGS. 1, 2, 3, 4, 5, 6, 7, 8, 9, 10, 14, 15, 16, 17 and 18, a motorized wheel barrow 10 includes a storage pan 20 and a handle assembly 21 connected to such a storage pan 20. Such a handle assembly 21 includes first and second rectilinear primary shafts 22, 23 converging inwardly towards a distal end 24 of the storage pan 20, and first and second support arms 25, 26 with opposed ends 27 are directly coupled, without the use of intervening elements, to an underside 28 of the storage pan 20 and distal ends 29 of the first and second primary shafts 22, 23 respectively. The hand assembly 21 further includes a cross-brace 30 with opposed ends 31 directly anchored, without the use of intervening elements, to the distal ends 29 of the first and second primary shafts 22, 23 respectively, and first and second stabilizing V-shaped levers 32, 33 directly mated, without the use of intervening elements, to respective undersides 34 of the first and second primary shafts 22, 23 respectively for balancing the storage pan 20 and a substantially stable position during non-transport conditions. The storage pan 20 will be comprised of a heavy-duty material designed specifically for hauling heavy materials.

Figure 12:
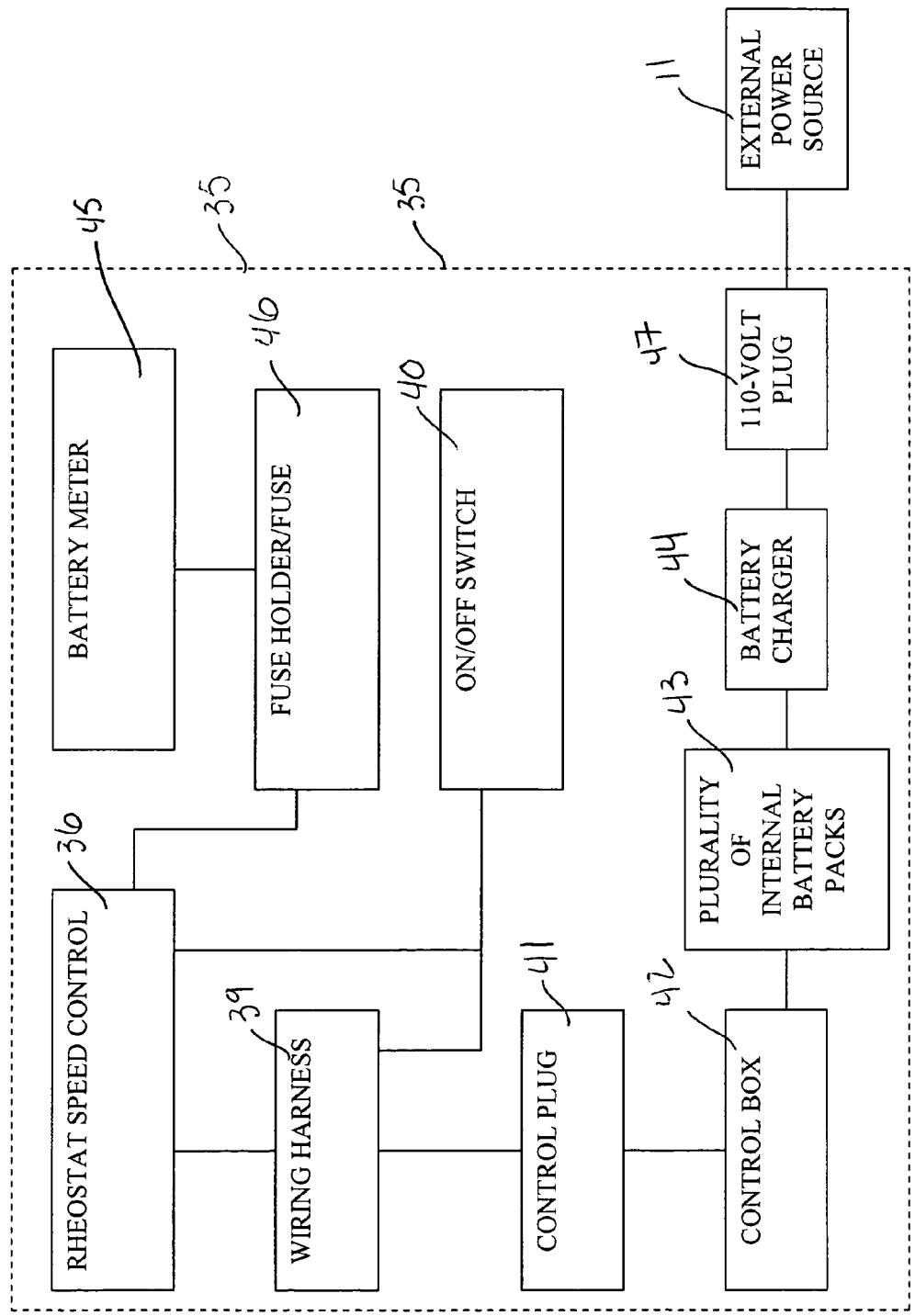
FIG. 12 is a schematic block diagram of the electrical control assembly, in accordance with the present invention.
Figure 13:
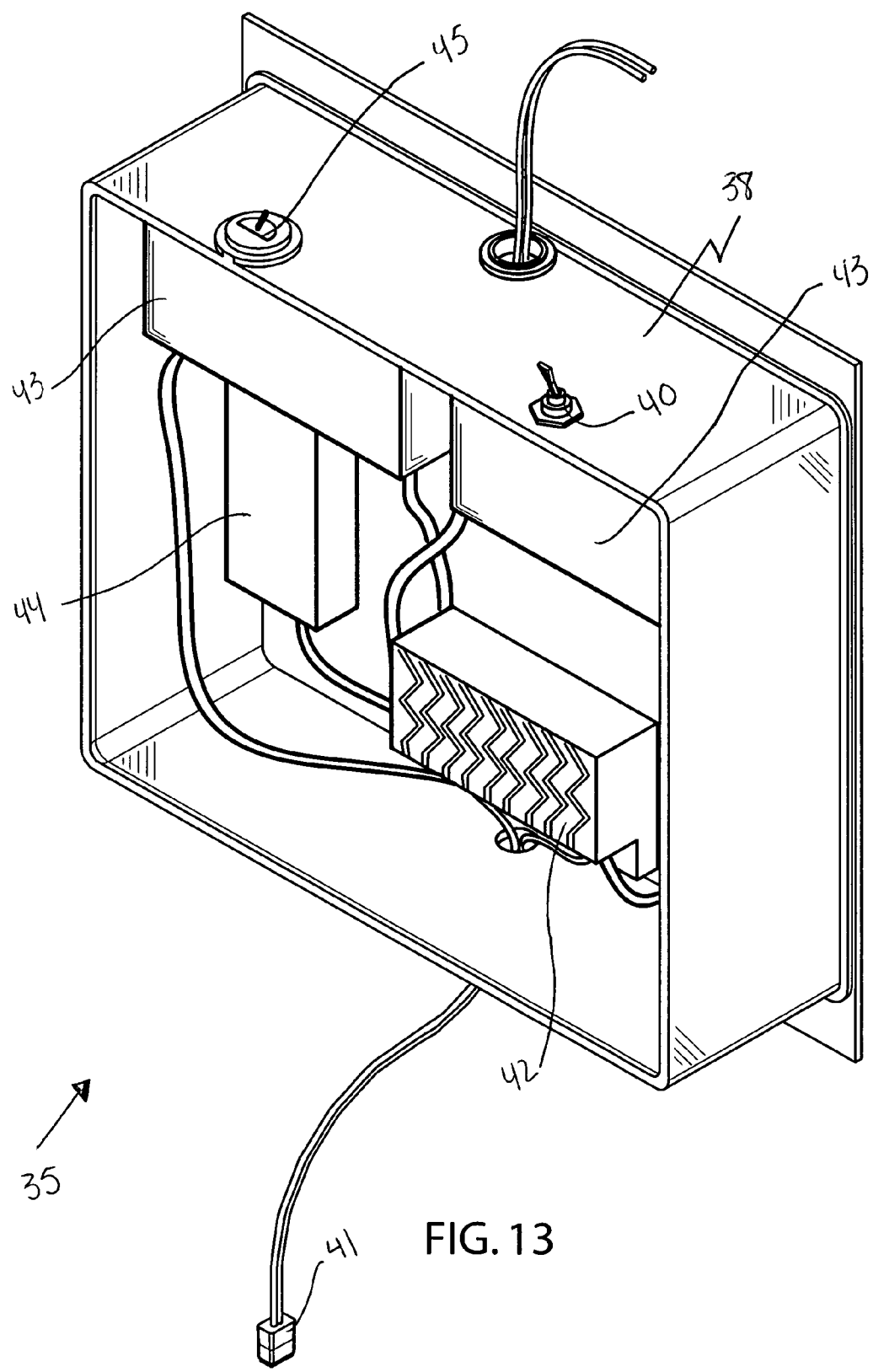
FIG. 13 is a perspective and enlarged view of the electrical control assembly, in accordance with the present invention.
Figure 14:
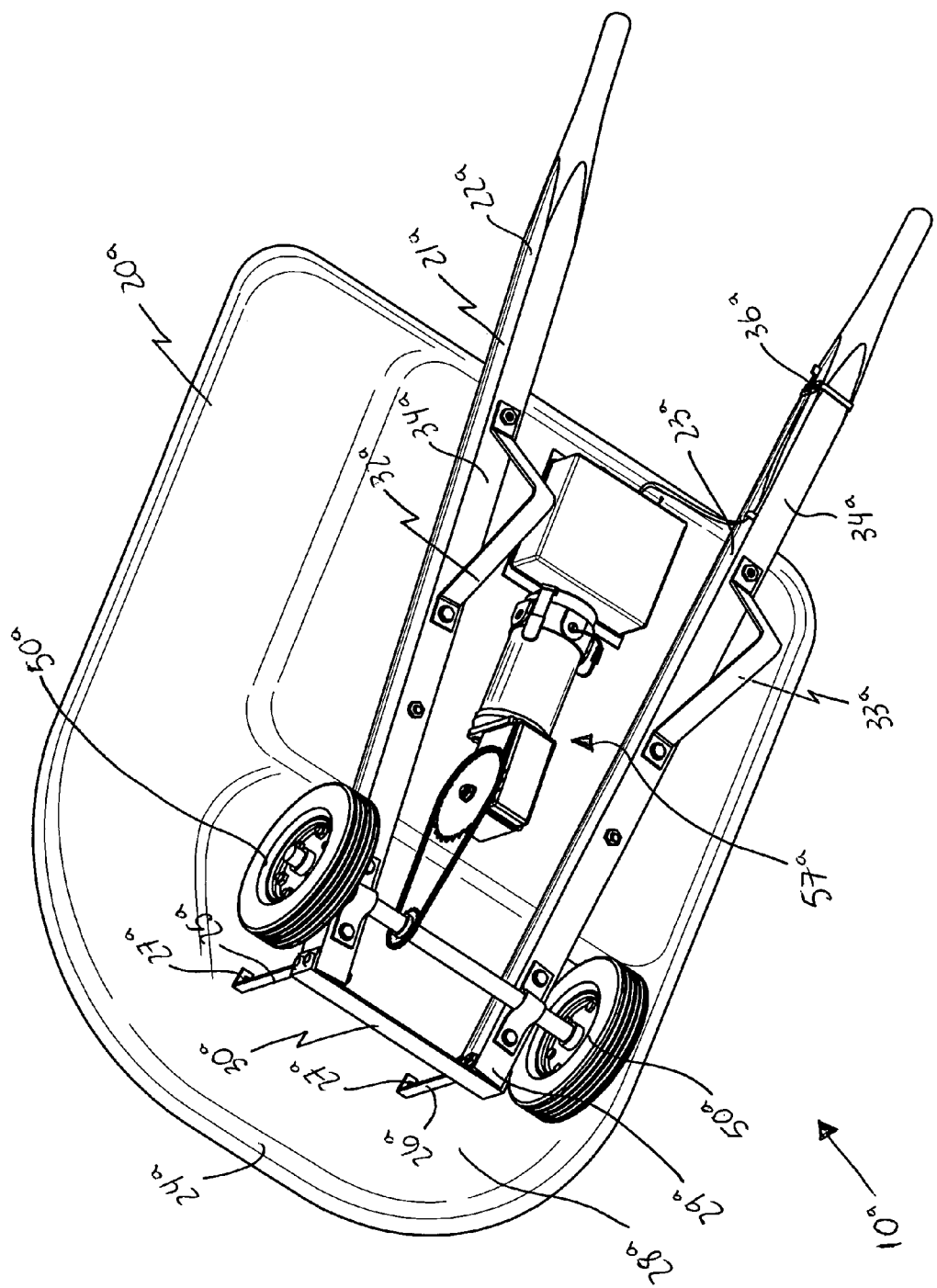
FIG. 14 is a perspective view of a third embodiment of the motorized wheelbarrow, in accordance with the present invention.
Figure 15:
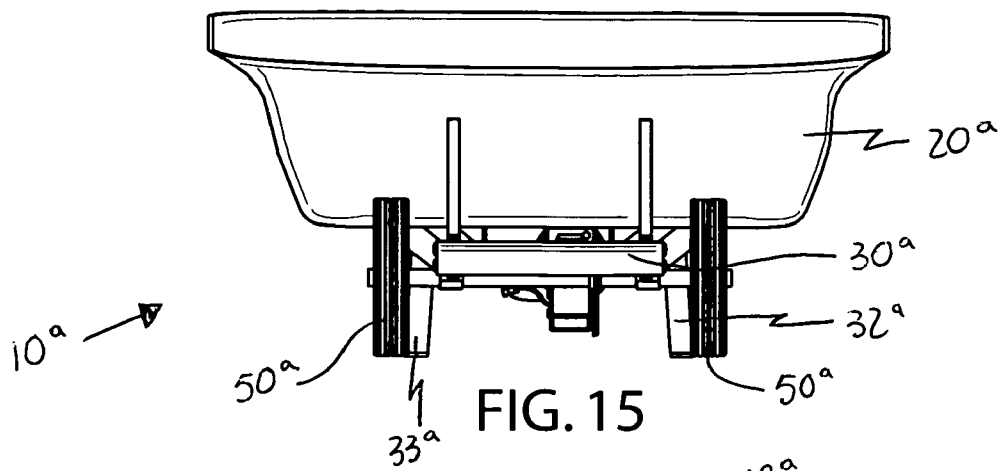
FIG. 15 is a front elevational view of the third embodiment of the motorized wheelbarrow, in accordance with the present invention.
Figure 16:
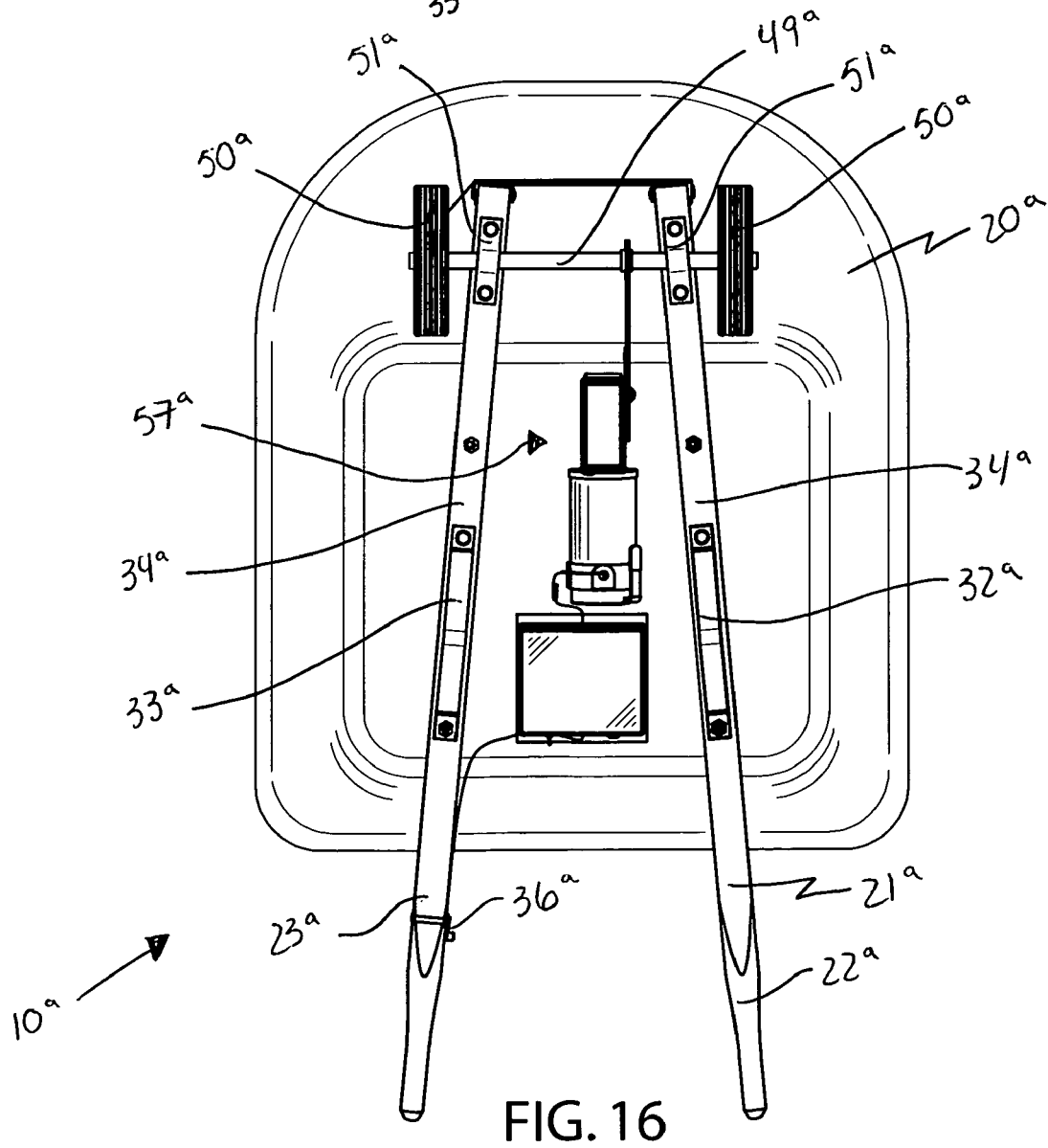
FIG. 16 is a bottom planar view of the third embodiment of the motorized wheelbarrow, in accordance with the present invention.
Figure 19:
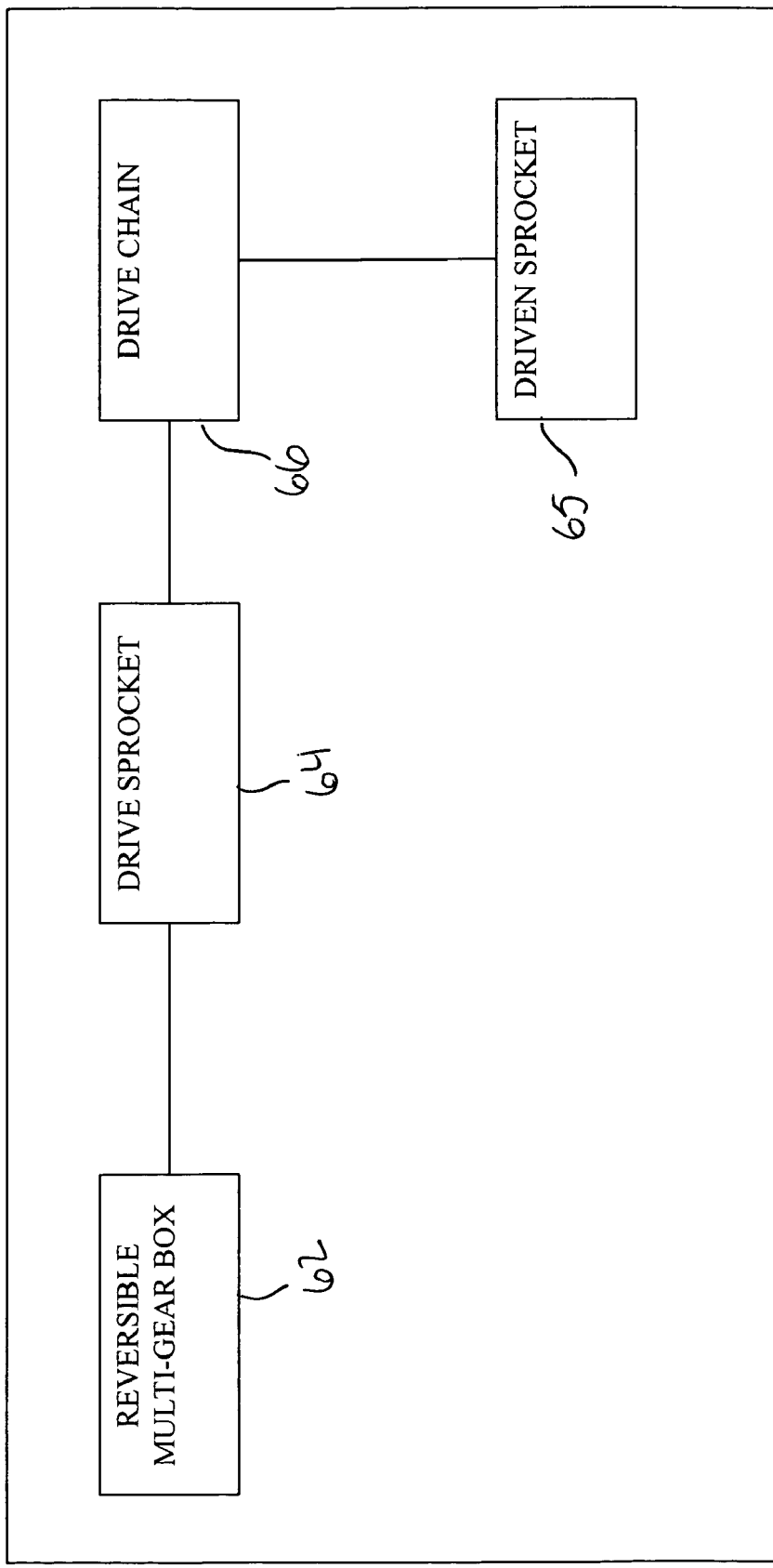
FIG. 19 is a schematic block diagram of the work gear assembly, in accordance with the present invention.
Figure 20:
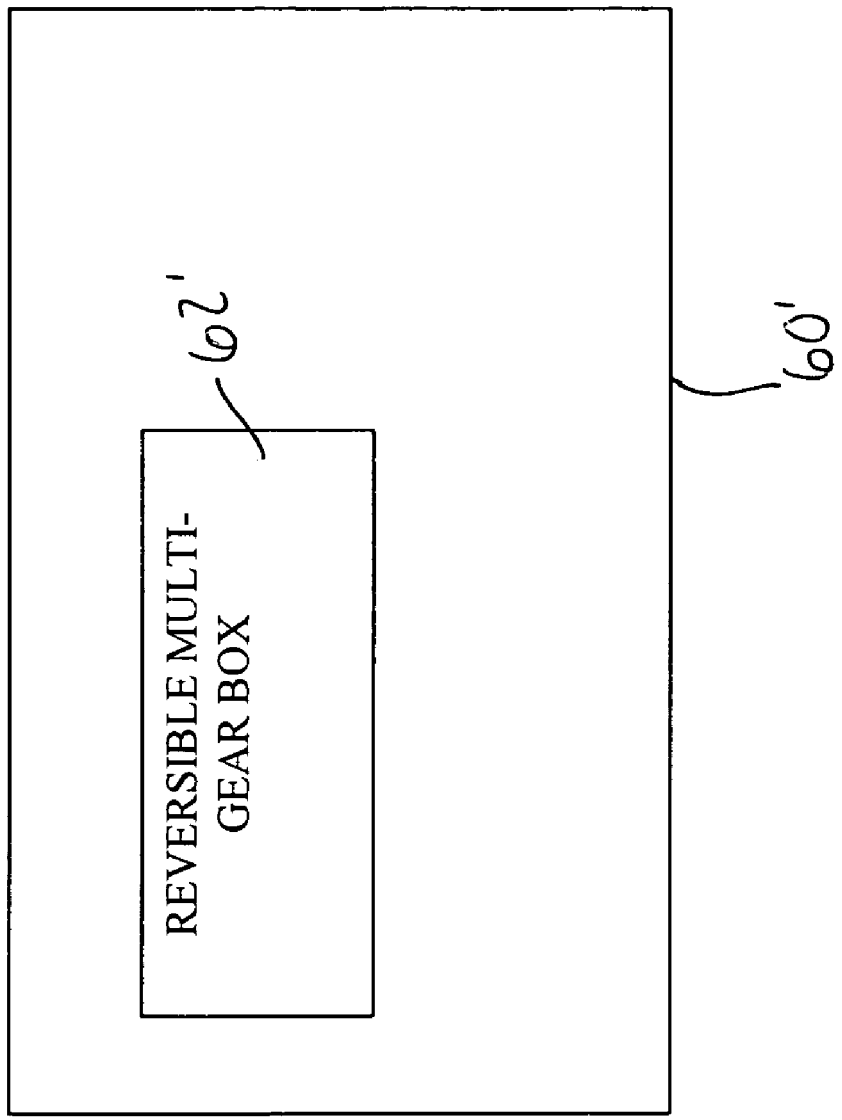
FIG. 20 is a schematic block diagram of an alternate embodiment of the work gear assembly, in accordance with the present invention.

Referring to FIGS. 12 and 13, the device 10 further includes an electrical control assembly 35 coupled to the storage pan 20. Such an electrical control assembly 35 includes a casing 38 mounted to an underside of the storage pan 20, a rheostat speed controller 36 mounted to a proximal end of the handle assembly 21 and disposed exterior of the casing 38, and a wiring harness 39 electrically coupled to rheostat speed controller 36 and disposed within the casing 38. The electrical control assembly 35 further includes an operating switch 40 electrically coupled to the rheostat speed controller 36 and the wiring harness 39, a fuse 46 electrically coupled to the rheostat speed controller 36 and the operating switch 40 and disposed within the casing 38, a control plug 41 electrically coupled to the wiring harness 39 and disposed within the casing 38, and a control box 42 electrically coupled directly to the control plug 41 and disposed within the casing 38. The electrical control assembly 35 further includes a plurality of internal batteries 43 electrically coupled to the control box 42 and disposed within the casing 38, a battery charger 44 electrically coupled to the internal batteries 43 and disposed within the casing 38, a battery meter 45 electrically coupled to the fuse 46 for indicating a quantity of power remaining in the internal batteries 43, and a power plug 47 electrically coupled to the battery charger 44 and selectively mated to an external power supply source 11. The speed controller 36 may be adjusted to reduce or increase the speed of the wheelbarrow. Alternatively, the controller may be adjusted to move the wheelbarrow forward or in reverse, or in null mode for keeping the device in neutral. When the controller is in null mode, it may be activated by squeezing the trigger, and the wheelbarrow will move forward. Pushing the trigger will cause the wheelbarrow to move backwards. The speed can be controlled in backward or forward modes by increasing or reducing the amount of pressure applied to the trigger.

Referring to FIGS. 1, 2, 3, 4, 5, 6, 7, 8, 9, 10, 11, 14, 15, 16, 17 and 18, the device 10 further includes a wheel assembly 48 with an axle 49 transversely spanning across a width of the storage pan 20 and coupled to the handle assembly 21 while remaining spaced from the storage pan 20. Such a wheel assembly 48 includes a first wheel 50 concentrically mounted to the axle 49 and centrally registered between lateral ends of the handle assembly 21, and a plurality of brackets 51 directly connected, without the use of intervening elements, to the axle 49 and the handle assembly 21 which is essential such that the axle 49 remains fixedly coupled to a bottom most surface of the handle assembly 21. An alternate embodiment of the wheel assembly 48 further includes first and second wheels 50 concentrically mounted to axially opposed ends 54 of the axle 49 and positioned outside lateral ends 55 of the handle assembly 21, and a plurality of brackets 51 directly connected, without the use of intervening elements, to the axle 49 and the handle assembly 21 which is important such that the axle 49 remains fixedly coupled to a bottom most surface of the handle assembly 21. The wheelbarrow 10 may include at least one wheel 50, but alternate embodiments of the invention may include two or more wheels, thereby improving the balance and utility of the device.

Referring to FIGS. 1, 3, 6, 11, 14, 16, 19 and 20, the device 10 further includes a mechanism 57 for automatically generating a torque at the wheel assembly 48 to thereby selectively propel the motorized wheel barrow along first and second opposed directions based upon first and second user inputs respectively. Such an automatic torque generating mechanism 57 is electrically coupled to the electrical control assembly 35 and includes an electric motor 58 mounted to the storage pan 20, a neutral gear lever 59 coupled to the electric motor 58 for allowing a user to adapt the electric motor 58 to a neutral position for enabling the user to manually push the wheelbarrow, and a multi-directional gear assembly 60 including a multi-directional gear box 62 coupled to the electric motor 58 and the wheel assembly 48 respectively. Such a multi-directional gear assembly 60 includes a reversible multi-gear box 62 directly coupled, without the use of intervening elements, to the electric motor 58 and the axle 49 respectively, and a reversible multi-gear box 62 directly coupled, without the use of intervening elements, to the electric motor 58 and the pan 20 respectively. The multi-directional gear assembly 60 further includes a drive sprocket 64 directly coupled, without the use of intervening elements, to the reversible multi-gear box 63 and spaced from the axle, a driven sprocket 65 directly and statically mounted, without the use of intervening elements, about the axle 49, and a drive chain 66 engaged about the drive and driven sprockets 64, 65 and thereby causing the axle 49 to rotate as the driven sprocket 65 rotates.

Suitable electric motors, sprockets and gear boxes may be purchased from Invacare Corporation's line of power-operated medical equipment. For example, portions of the torque generating mechanism of FIGS. 2-5 may be built by employing Invacare's model number: 1085952; manufacturing number: 509012; and part number: 1070791. Similarly, portions of the torque generating mechanism of FIGS. 14-17 may be built by employing Invacare's model number: 1085952; manufacturing number: 5097037; and part number: 10867224. Further, portions of the torque generating mechanism of FIGS. 6-10 may be built by employing Invacare's model number: E675, type A; part number: 615209001 0002 9367A 2104-0084 (24 volt). It should be understood that such references to Invacare's product line are provided as non-limiting examples and are not intended to narrow the true scope of applicant's claimed invention.

The device includes a metal wheelbarrow that includes a battery and battery operated motor. The wheelbarrow pan (sometimes referred to as a tray or tub) is produced from high quality, heavy gauge, seamless steel. Such a pan is sized significantly larger than conventional wheelbarrow pans, which is essential for making it possible to transport much larger loads without compromising the stability of the wheelbarrow. The pan is effectively supported by a heavy duty steel brace on each side with a wheel assembly attached to the lower end of each brace. An additional wheel assembly may be attached to a brace that extends outward from the front end of the pan which is effectively used for steering. The wheel assemblies attached to the steel braces are effectively driven by a DC motor that is controlled by a rheostat type switch which is positioned on one of the wheelbarrow handles.

The drive shaft of the motor is directly connected, without the use of intervening elements, to a gear assembly which is used to rotate the wheels. After a load has been placed or filled into the interior area of the pan, the rheostat switch is moved from the null position to effectively activate the motor. Such a rheostat switch is moved further away from the null position to increase the speed of the motor for effectively moving the wheelbarrow faster.

The present invention, as claimed, provides the unexpected and unpredictable benefit of a device that is convenient and easy to use, is durable yet lightweight in design, is versatile in its applications, and provides users with a convenient means of transporting large loads between remote locations. Such a power driven wheelbarrow advantageously eliminates the need for a user to physically push the wheelbarrow from one point to another, thus saving a considerable amount of energy. Since the individual will not become worn out as quickly as normal, they can do more work in the same, or less, amount of time. The power driven wheelbarrow is produced of durable materials, which ensures that the device will withstand years of continued use.

In use, a method for transporting objects between remote locations includes the steps of: providing a storage pan 20; providing and connecting a handle assembly 21 to the storage pan 20; providing and coupling an electrical control assembly 35 to the storage pan 20; providing a wheel assembly 48 with an axle 49 transversely spanning across a width of the storage pan 20; coupling the wheel assembly 48 to the handle assembly 21 while maintaining the wheel assembly 48 spaced from the storage pan 20; and automatically generating a torque at the wheel assembly 48 and thereby selectively propelling the motorized wheel barrow 10 along first and second opposed directions based upon first and second user inputs respectively.

In use, the method further includes the steps of: providing and mounting an electric motor 58 to the storage pan 20; providing and coupling a neutral gear lever 59 to the electric motor 58 for allowing a user to adapt the electric motor 58 to a neutral position; and providing and coupling a multi-directional gear assembly 60 including a multi-directional gear box 62 to the electric motor 58 and the wheel assembly 48 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A motorized wheel barrow for transporting objects between remote locations, said motorized wheel barrow comprising:
    a storage pan;
    a handle assembly connected to said storage pan;
    an electrical control assembly coupled to said storage pan;
    a wheel assembly having an axle transversely spanning across a width of said storage pan and being coupled to said handle assembly; and
    means for generating a torque at said wheel assembly to thereby selectively propel said motorized wheel barrow along first and second opposed directions based upon first and second user inputs respectively, said torque generating means being electrically coupled to said electrical control assembly;
    wherein said torque generating means comprises
        an electric motor mounted to said storage pan,
        a neutral gear lever coupled to said electric motor for allowing a user to adapt said electric motor to a neutral position, and
        a multi-directional gear assembly comprising a multi-directional gear box coupled to said electric motor and said wheel assembly respectively.

2. The motorized wheel barrow of claim 1, wherein said multi-directional gear assembly comprises: a reversible multi-gear box directly coupled to said electric motor and said axle respectively.

3. The motorized wheel barrow of claim 1, wherein said multi-directional gear assembly comprises:
    a reversible multi-gear box directly coupled to said electric motor and said pan respectively;

a drive sprocket directly coupled to said reversible multi-gear box and being spaced from said axle;

a driven sprocket directly and statically mounted about said axle; and a drive chain engaged about said drive and driven sprockets and thereby causing said axle to rotate as said driven sprocket rotates.

4. The motorized wheel barrow of claim 1, wherein said electrical control assembly comprises:

a casing mounted to an underside of said storage pan;

a rheostat speed controller mounted to a proximal end of said handle assembly and disposed exterior of said casing;

a wiring harness electrically coupled to rheostat speed controller and disposed within said casing;

an operating switch electrically coupled to said rheostat speed controller and said wiring harness;

a fuse electrically coupled to said rheostat speed controller and said operating switch and being disposed within said casing;

a control plug electrically coupled to said wiring harness and being disposed within said casing;

a control box electrically coupled directly to said control plug and being disposed within said casing;

a plurality of internal batteries electrically coupled to said control box and being disposed within said casing;

a battery charger electrically coupled to said internal batteries and being disposed within said casing;

a battery meter electrically coupled to said fuse for indicating a quantity of power remaining in said internal batteries; and a power plug electrically coupled to said battery charger and being selectively mated to an external power supply source.

* * * * *